United States Patent
Halimi et al.

(10) Patent No.: US 6,182,449 B1
(45) Date of Patent: Feb. 6, 2001

(54) CHARGE AIR SYSTEMS FOR TWO-CYCLE INTERNAL COMBUSTION ENGINES

(75) Inventors: Edward M. Halimi, Montecito; Ralph P. Maloof, Calabasas; William E. Woollenweber, Carlsbad, all of CA (US)

(73) Assignee: Turbodyne Systems, Inc., Carpinteria, CA (US)

( * ) Notice: Under 35 U.S.C. 154(b), the term of this patent shall be extended for 0 days.

(21) Appl. No.: 09/125,010

(22) Filed: May 7, 1998

Related U.S. Application Data

(63) Continuation of application No. PCT/US96/17007, filed on Oct. 26, 1996, and a continuation-in-part of application No. 08/549,436, filed on Oct. 27, 1995, now abandoned.

(51) Int. Cl.$^7$ ..................................................... F02B 33/44
(52) U.S. Cl. ........................ 60/612; 60/608; 123/65 BA; 123/65 VC; 123/735
(58) Field of Search ............................ 60/607, 608, 612; 123/73 S, 65 BA, 65 VC

(56) References Cited

U.S. PATENT DOCUMENTS

| | | | |
|---|---|---|---|
| 2,620,621 | 12/1952 | Nettel | 60/612 |
| 2,710,521 | 6/1955 | Nettel | 60/608 |
| 3,676,999 | 7/1972 | Oldfield | 60/608 |
| 4,901,530 | 2/1990 | Kawamura | 60/608 |
| 4,958,497 | 9/1990 | Kawamura | 60/612 |

FOREIGN PATENT DOCUMENTS

| | | | |
|---|---|---|---|
| 684902 | 3/1930 | (FR) | 60/612 |
| 267149 | 8/1927 | (GB) | 60/612 |
| 1181488 | 2/1970 | (GB) | 60/612 |
| 44-22569 | 9/1969 | (JP) | 60/612 |
| 57-212331 | 12/1982 | (JP) | 60/612 |

*Primary Examiner*—Michael Koczo
(74) *Attorney, Agent, or Firm*—Brinks Hofer Gilson & Lione

(57) ABSTRACT

A two-cycle internal combustion engine (10, 46, 66, 75, 86) has a motor-assisted turbocharger (13) where the motor (17, 56, 65, 77, 95) is activated by an external power source (18) to operate the turbocharger (13) to apply scavenging and charging air for starting the engine (10, 46, 66, 75, 86). When sufficient exhaust gas energy is available to allow the turbocharger (13) to provide adequate scavenging and charging air, the motor (17, 56, 65, 77, 95) is de-energized to eliminate the need for external power. Thus, the charging system acts as a supercharger during start-up and as a turbocharger during normal running. A control system (19, 57, 68, 78, 88) is connected to the driving motor (17, 56, 65, 77, 95) that receives signals (25) so that power is supplied to the motor (17, 56, 65, 77, 95) during start-up and may also be supplied during low exhaust gas energy levels to maintain a sufficient supply of scavenging and charging air. These signals (25) may come from engine speed, turbocharger speed, intake manifold pressure, throttle position and the like. In the case of a small crankcase-scavenged, two-cycle engine, a motor-driven compressor (40, 58, 72, 80) may be used to augment the supply of scavenging air provided by the downstroke of the piston. A motor-driven compressor (58, 72) can be arranged in series with a turbocharger compressor (60, 74) to provide high pressure charge air to a two-cycle engine by virtue of being connected in series.

2 Claims, 9 Drawing Sheets

CHARGE AIR SYSTEMS FOR TWO-CYCLE INTERNAL COMBUSTION ENGINES

This patent application is a continuation of International patent application Ser. No. PCT/US96/17007 filed Oct. 26, 1996 and a continuation-in-part of U.S. patent application Ser. No. 08/549,436 filed Oct. 27, 1995, abandoned.

TECHNICAL FIELD

This invention is directed to apparatus and methods of supplying charge air for two-cycle internal combustion engines, including a motor-assisted turbocharger, a motor-driven compressor, or a motor-driven compressor connected in series with a turbocharger compressor.

BACKGROUND ART

The most common internal combustion engine in use today is the four-cycle type, either spark ignited or diesel, wherein there is one power stroke for every two revolutions of the crankshaft. This type of engine has a suction stroke by which it can aspirate its own air, and thus it is able to start and run without the aid of an external or auxiliary air supply. In contrast, the two-cycle internal combustion engine does not have a separate suction stroke since there is a power stroke for every revolution of the crankshaft. Consequently, the two-cycle engine must employ other means of exhausting and charging the cylinder with fresh air after each power stroke has been completed.

Typically, two-cycle engines use either an engine-driven compressor or crankcase air compression to force air into the intake ports of the cylinders. Crankcase compression is undesirable due to the tendency to mix lubricant oil present in the crankcase with the air which can cause excessive lubricant oil consumption and increase the amount of pollutants in the exhaust gases. Thus, it is more desirable to use an air compressor driven separately than from the engine to provide the necessary air supply for starting and running the engine.

When engine-driven compressors are used, the fuel consumption of the engine is increased by virtue of the horsepower absorbed by the compressor. Adding an exhaust gas-driven turbocharger in series with the engine-driven compressor is a substantial improvement. However, there is still a residual power drain on the engine caused by the engine-driven compressor and its gear train. Clutches between the engine-driven compressor and the engine have been used to disconnect the compressor from the engine when the turbocharger is capable of scavenging and charging the cylinders by itself. However, the addition of a clutch in the compressor drive train adds a very significant amount of cost and complication to the mechanical configuration of the engine.

DISCLOSURE OF THE INVENTION

One very important objective of this invention is to eliminate the need for an engine-driven compressor on a two-cycle engine by employing a turbocharger with an internal, integral motor that can be energized from an external power supply, such as a battery system. The motor can be supplied with power during cranking of the engine thereby rotating the turbocharger compressor to a speed necessary to force air into the engine intake system to start the engine and permit it to run at idle. The motor remains active as long as the energy level in the exhaust gas in insufficient to allow the turbocharger to scavenge and charge the engine on its own. When the turbocharger is capable of providing an intake manifold pressure higher than the exhaust back pressure on the cylinder, the motor is de-energized and the power drain on the electrical system is eliminated. By suitable control means, the motor can be energized at any time the exhaust gas energy is insufficient to drive the turbocharger at a high enough speed to sustain proper engine operation.

One method of control of the motor power supply is to sense the pressure in the engine intake manifold and turn the power on to the motor when the level falls below a predetermined level and vice versa. Other means of control can also be employed where the motor remains energized at a lower power level at all times to maintain the turbocharger rotor speed at a predetermined minimum level. In this manner, the inertia of the turbocharger rotor is counteracted by the motor torque and the time to accelerate the turbocharger rotor where the engine throttle is opened is shortened significantly. By substantially reducing this so-called "turbocharger lag," the engine accelerates faster, the vehicle driven becomes more responsive, and undesirable pollutants in the exhaust gases are markedly reduced.

In order to aid in the understanding of this invention, it can be stated in essentially summary form that it is directed to a motor-assisted turbocharger and/or a motor-driven compressor for use on two-cycle internal combustion engines. The motor drive, which is separate from the operation of the two-cycle internal combustion engine, permits the starting of the two-cycle internal combustion engine by supplying scavenging and charging air.

Thus, it is a purpose and advantage of this invention to provide a motor-assisted turbocharger where the compressor of the turbocharger is driven mainly by the motor at low speeds and by exhaust gas energy at high speeds.

It is a further purpose and advantage of this invention to supply a motor-assisted turbocharger which aids in the acceleration of the engine from low to high speed in a manner which produces less undesirable products of combustion.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BEST MODE FOR CARRYING OUT THE INVENTION

Figure 1:
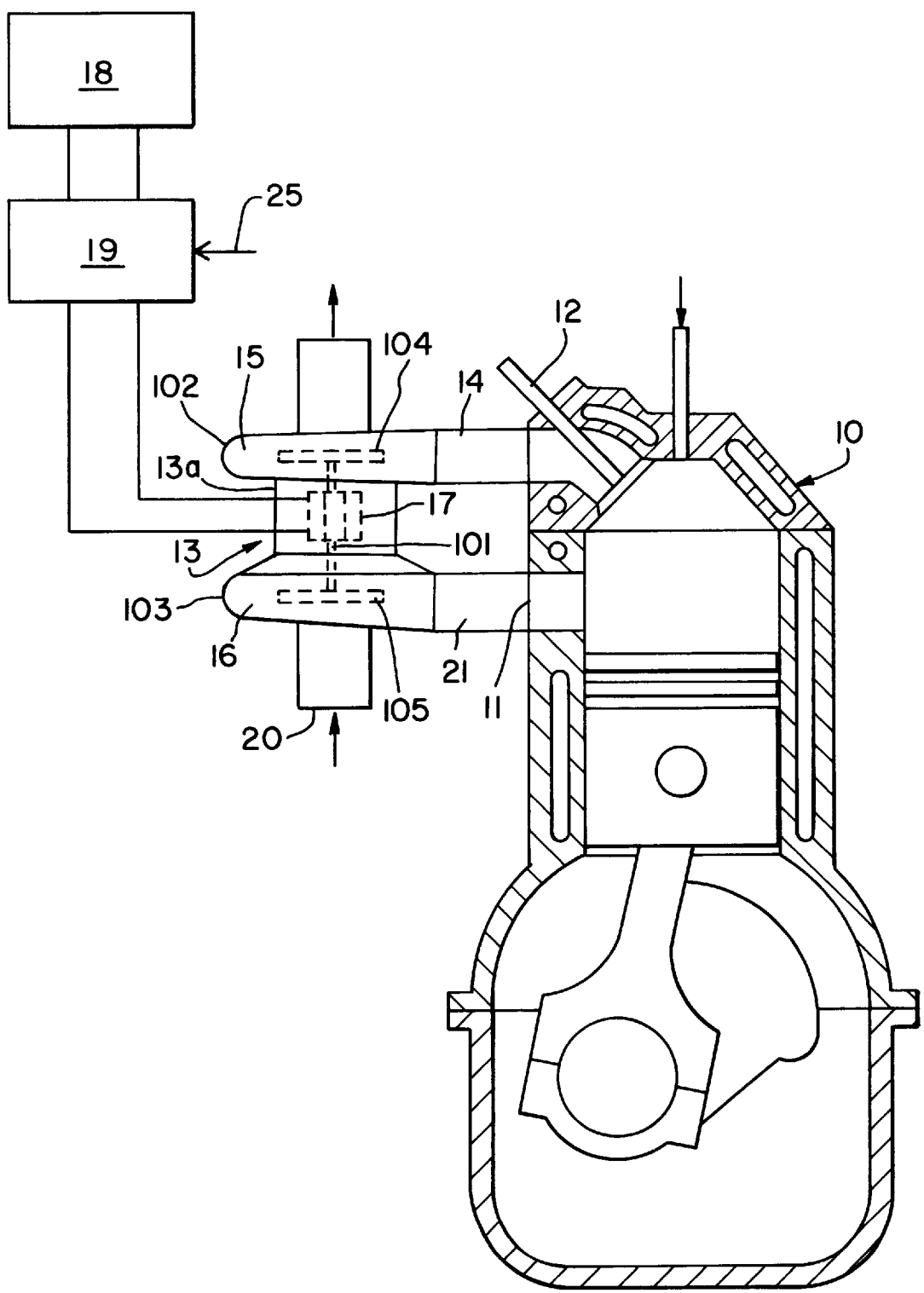
FIG. 1 is a diagrammatic cross-sectional illustration of a uniflow-scavenged, two-cycle engine employing a motor-assisted turbocharger for supplying a charge air for starting the engine and operating the engine at low loads and speeds.

A first preferred embodiment of the invention consists of a motor-assisted turbocharger that has a centrifugal compressor connected to supply air to the intake ports of a two-cycle engine, as illustrated in FIG. 1. The centrifugal compressor is also connected to be driven by an exhaust gas turbine, mounted on the same shaft, which is connected to receive exhaust gas from the cylinders of the engine. The turbocharger is provided with an internal motor arranged to provide torque to the turbocharger rotor assembly. Suitable control means are provided to energize the motor even before the engine is cranked so as to supply charge air for starting the engine. The motor remains energized as long as the turbocharger is incapable of supplying scavenging and charging air to maintain proper running of the engine.

Referring to FIG. 1, a two-cycle internal combustion engine 10 is shown with air intake ports 11 in the cylinder wall and exhaust valving 12 in the cylinder head to allow what is commonly termed uniflow scavenging of the combustion space. A turbocharger 13 is mounted to accept exhaust gas from the engine cylinders through manifolding 14, which expands through the turbine 15 to drive compressor 16, mounted on the other end of the rotor shaft. The turbocharger 13 includes a turbocharger housing 13a having a shaft 101 rotatably mounted in the housing. An exhaust gas turbine scroll 102 and a compressor scroll 103 are mounted on the housing, and a turbine rotor 104 and a compressor rotor 105 are mounted to the shaft 101 for rotation within the exhaust gas turbine scroll 102 and the compressor scroll 103, respectively. As known to those skilled in the art, exhaust gas from the engine rotates the turbine rotor and the shaft which, in turn, rotates the compressor rotor so that the engine exhaust gas drives the compressor rotor to deliver compressed air to the inlet manifold when the engine is running.

Also interposed internally in the turbocharger between the turbine rotor and the compressor rotor is an electric motor 17 arranged to impart driving torque to the compressor rotor when energized from an external power source 18. The power to the motor is turned on, modulated, or turned off by a control means 19 in response to various input signals (generally designated at 25) from operational parameters. These parameters can be engine speed, turbocharger speed, intake manifold pressure, throttle position, and the like.

Outside air enters the intake of the turbocharger compressor 20, preferably from an air cleaner (not shown) and is directed to the intake manifold 21 in the cylinder wall. On the upstroke of the piston, the exhaust valve 21 closes, the intake ports 11 are covered, and compression of the air charge occurs. Fuel enters the cylinder near top dead center, where combustion occurs, forcing the piston down on the power stroke. When the piston reaches the latter part of the power stroke, the exhaust valve opens allowing blow down of the high pressure exhaust gas into the exhaust manifold, where it flows to the turbocharger turbine 15. The piston then uncovers the intake port and allows charge air to enter the cylinder, force out the residual exhaust gas, and fill the cylinder with a fresh charge for a repetition of the process each revolution of the crankshaft.

When the operator desires to start the engine, electric motor 17 is supplied with power from control means 19 to supply adequate air for engine breathing. The turbocharger rotating assembly is then brought up to an adequate speed by electric motor power to provide charge air for starting. When sufficient air pressure is available from the turbocharger compressor, the engine is cranked over by the starting motor. After the engine is started, the control means senses when the exhaust gas turbine is able to supply adequate pressurization of the intake manifold system without the motor. At that time, the internal motor 17 can be de-energized allowing the engine to operate at normal speeds and loads. However, at any time the engine is operated at low speed and load or at idling conditions, the motor is re-energized by an appropriate signal to the control means, in order to maintain the turbocharger operating speed high enough to provide enough charge air to keep the engine running.

Figure 2:
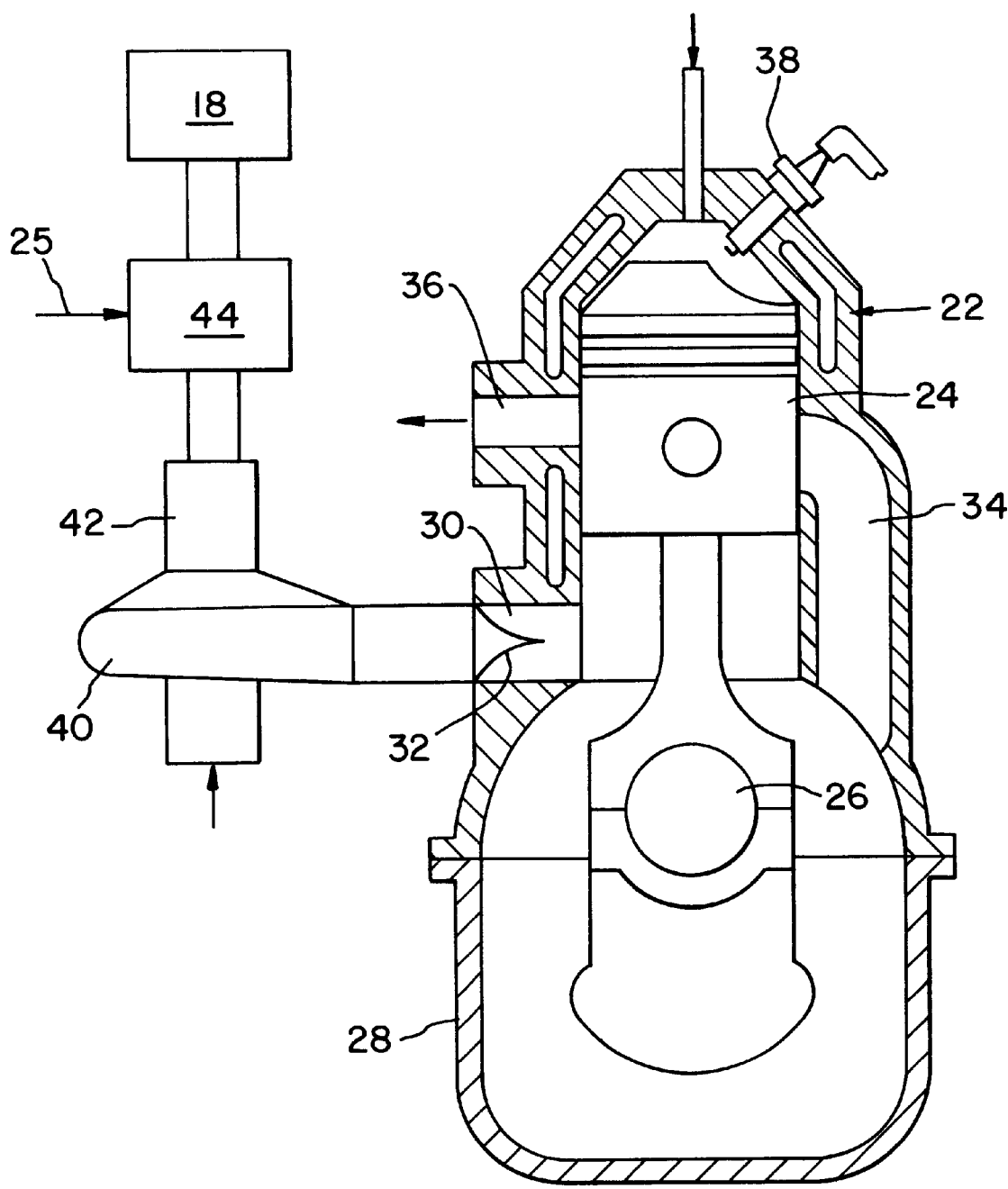
FIG. 2 is a diagrammatic cross-sectional view of a crankcase-scavenged, two-cycle engine using a motor-driven compressor to supplement the crankcase air supply for faster acceleration and higher horsepower output.

FIG. 2 shows another embodiment of this invention wherein an electric motor-driven compressor is connected to the air intake port or a crankcase-scavenged, two-cycle engine. In this case, the motor is energized to aid in starting and in accelerating the engine. Since the motor-driven compressor provides more air than can be generated by crankcase compression, additional fuel can be supplied to the cylinders during acceleration and at maximum power demand for enhancing the power output of a given size engine and for shortening the time to accelerate the engine and driven vehicle from low to high speed. The provision of more air during acceleration leads to more efficient combustion of fuel, and thus reduces the amount of pollutants present in the exhaust gas during the acceleration period. Suitable control means are provided to turn on current to the motor when needed. Suitable controls are also provided to maintain the motor-driven compressor at a predetermined minimum speed so as to minimize the restriction of air flow to the intake ports that might be present if the centrifugal compressor remains inactive.

Referring to FIG. 2, the engine 22 has a piston 24 which reciprocates up and down in a cylinder under control of crank 26. The crank operates in a closed crankcase 28. The air intake port 30 into the crankcase has a reed valve 32 which allows air only into the crankcase. As the piston moves down, the air in the crankcase which is compressed by the downward motion of the piston moves upward through transfer passage 34 into the cylinder. The exhaust port 36 is uncovered at this position of the piston. Thus, the air scavenges the cylinder and provides a new charge of air. The air is compressed as the piston moves upward and closes off the exhaust port. As fuel is introduced near to the top dead center, the spark plug 38 initiates ignition.

Rotary compressor 40 is driven by electric motor 42, which receives appropriate signals from control means 44 so that adequate air is supplied to the engine 22. Starting air is required, and acceleration can be enhanced by additional air. The control means 44 receives signals 25 indicating when starting is required and when acceleration is required so that appropriate power is supplied to the electric motor to suitably drive the compressor 40.

Figure 3:
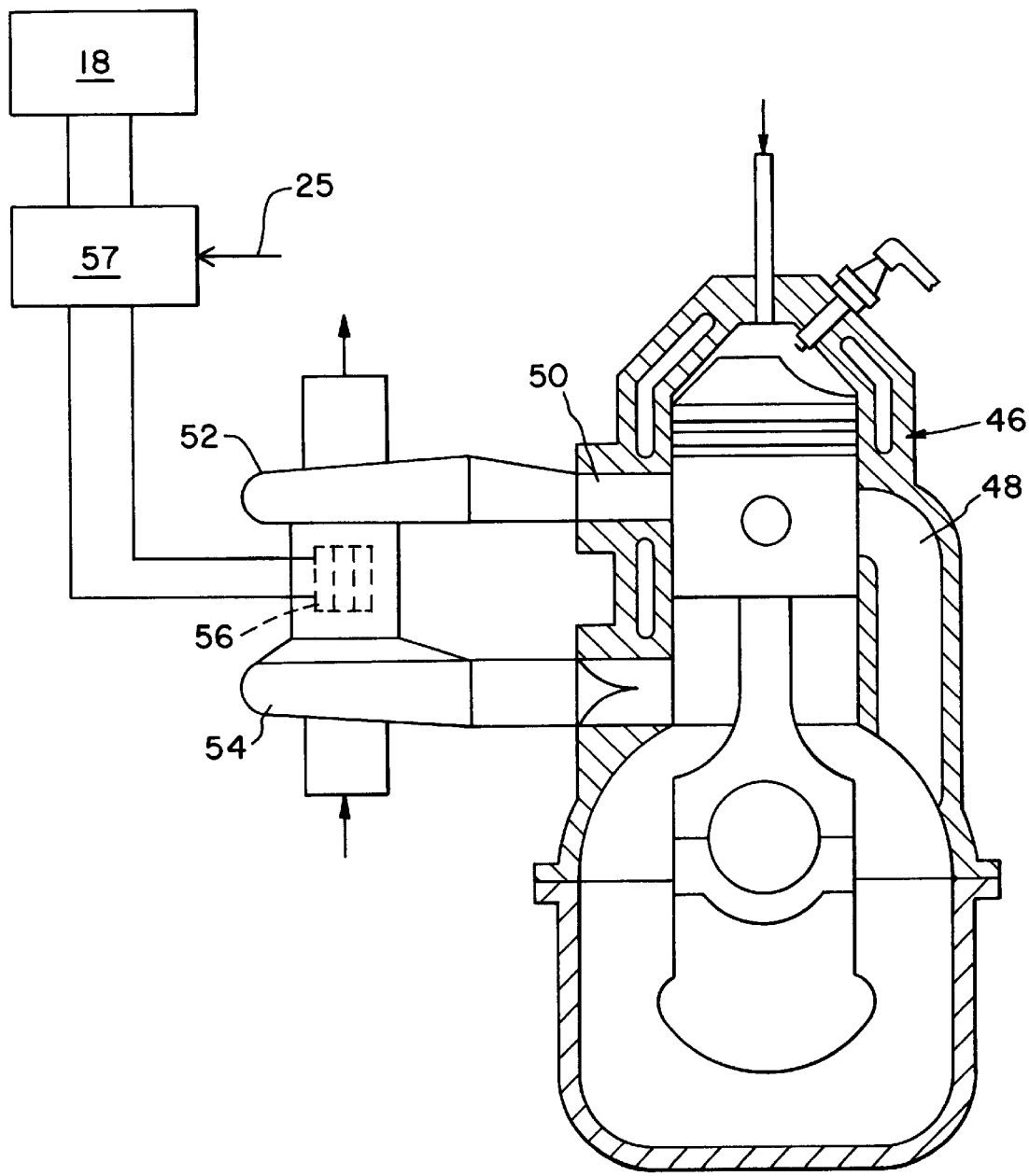
FIG. 3 is a diagrammatic cross-sectional view of a crankcase-scavenged, two-cycle engine with a motor-assisted turbocharger used to augment the crankcase compression for higher power output and faster acceleration.

A third embodiment of this invention is illustrated in FIG. 3 where a motor-assisted turbocharger is provided to augment the air supplied by crankcase compression in a crankcase-scavenged, two-cycle internal combustion engine. The internal motor in the turbocharger is energized when more power is required for accelerating the engine under load, and for maintaining the speed of the turbocharger rotor at a predetermined minimum level.

The embodiment of FIG. 3 has an engine 46, which is the same as engine 22. That is to say it has a transfer passage 48 with an inlet port which is uncovered by the piston as it moves downward from the top dead center position shown in FIG. 3. Exhaust port 50 is first uncovered so that high pressure exhaust gas is discharged to exhaust gas turbine 52. The exhaust gas turbine drives rotary compressor 54. The rotary compressor can also be driven by electric motor 56, which is between the turbine and compressor and mounted on the shaft therebetween.

When running, the exhaust gas from the engine is sufficient to drive the exhaust gas turbine 52 with enough power to drive the compressor 54 to supply adequate air flow through the air intake port and reed valve into the crankcase. However, during starting, the compressor is driven by the electric motor and supplies enough starting air to start the engine. The system can be configured so that additional electric motor power may or may not be needed during times of engine acceleration. Control means 57 is similar to the previously described control means 44 and functions in the same manner.

Figure 4:
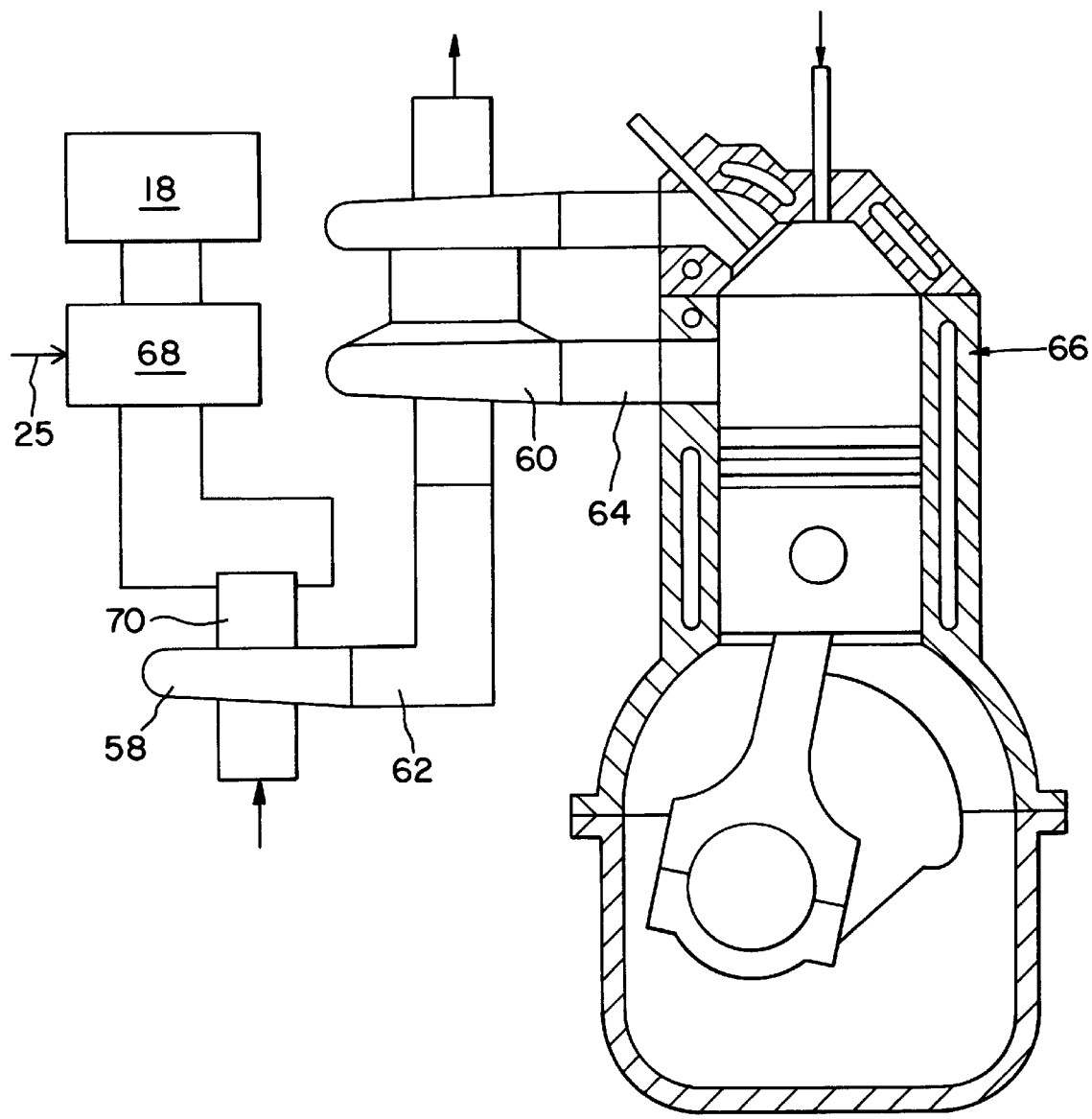
FIG. 4 shows a diagrammatic cross-section of a uniflow-scavenged, two-cycle engine using a conventional turbocharger and motor-driven compressor with their compressors arranged in series for charging and starting of the engine.

In a fourth embodiment of this invention illustrated in FIG. 4, an electric motor-driven compressor 58 is provided in series with a turbocharger compressor 60. The air outlet 62 of the motor-driven compressor is connected to the air inlet of the turbocharger compressor. The outlet 64 of the turbocharger compressor is connected to the air intake system of a two-cycle engine 66. The motor-driven compressor 58 is energized for starting the engine and supplies starting air through the open passages of the turbocharger's centrifugal compressor 60. After starting, the motor-driven compressor 58 assists the turbocharger compressor's capability of supplying charge air to keep the engine 66 running at idle and low loads. Suitable control means 68 are provided to turn the motor 70 on when needed or to maintain the motor-driven compressor 58 at a predetermined minimum speed.

Figure 5:
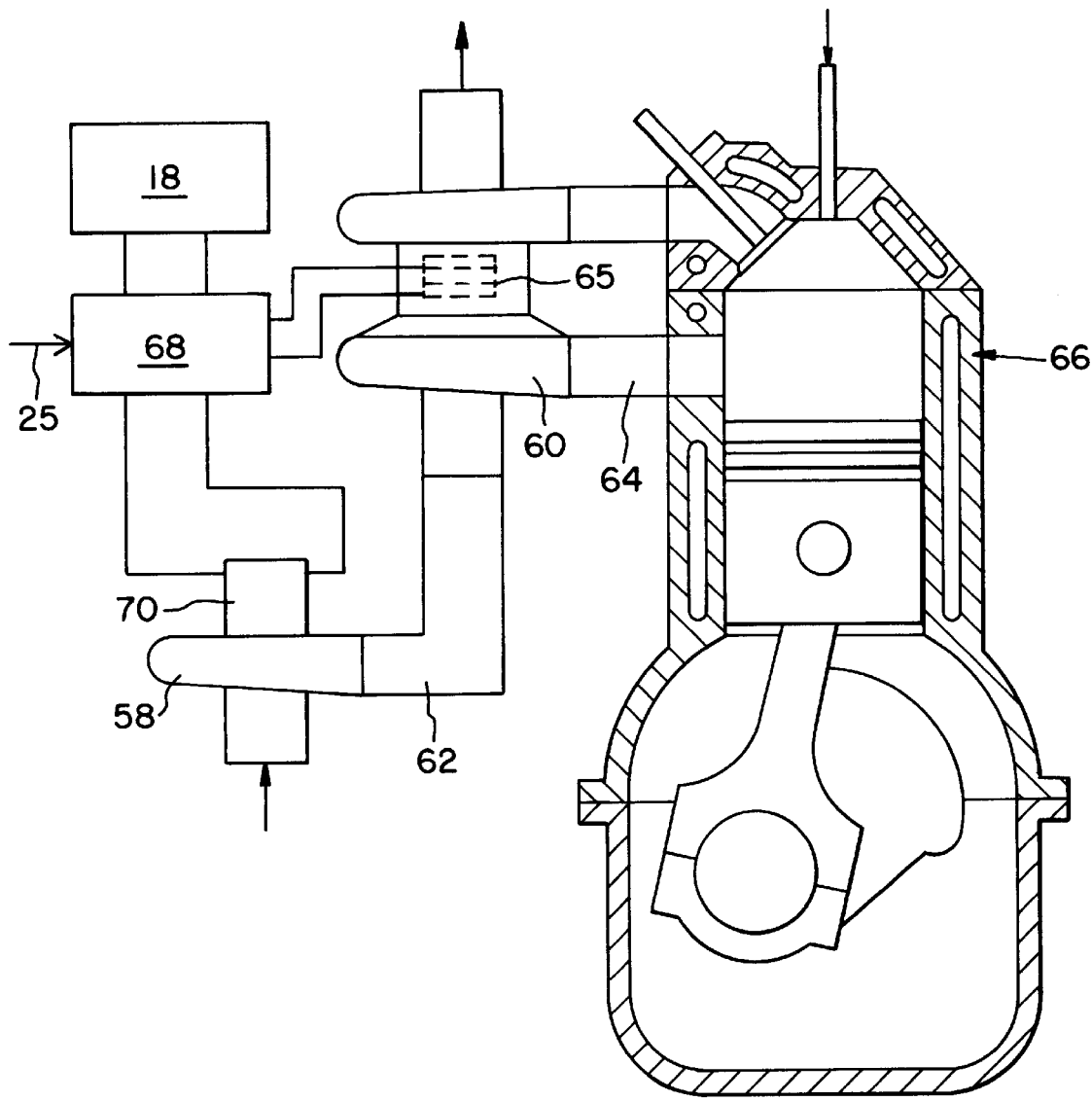
FIG. 5 shows a diagrammatic cross-section of a uniflow-scavenged, two-cycle engine using a motor-assisted turbocharger and a motor-driven compressor with their compressors arranged in series for starting and charging the engine.

The operation of the system shown in FIG. 4 can be enhanced by the addition of an internal motor in the turbocharger as illustrated in FIG. 5. Specifically, FIG. 5 shows a diagrammatic cross-section of a uniflow-scavenged, two-cycle engine using a motor-assisted turbocharger and a motor-driven compressor with their compressors arranged in series for starting and charging the engine.

Similar to the embodiment of FIG. 1, the turbocharger shown in FIG. 5 has an internal motor 65 arranged to impart driving torque to the turbocharger rotor when energized from external power source 18. The power to the motor is turned on, modulated or turned off by control means 68 in response to input signals 25 from operational parameters. The internal motor 65 can be energized during starting to assist in supplying starting air to start the engine, and, in general, to provide additional electric motor power when needed. For example, it may be energized during times of engine acceleration under load or when the engine is operated at low speed and load or at idling conditions to ensure enough charge air is provided to keep the engine running properly.

Figure 6:
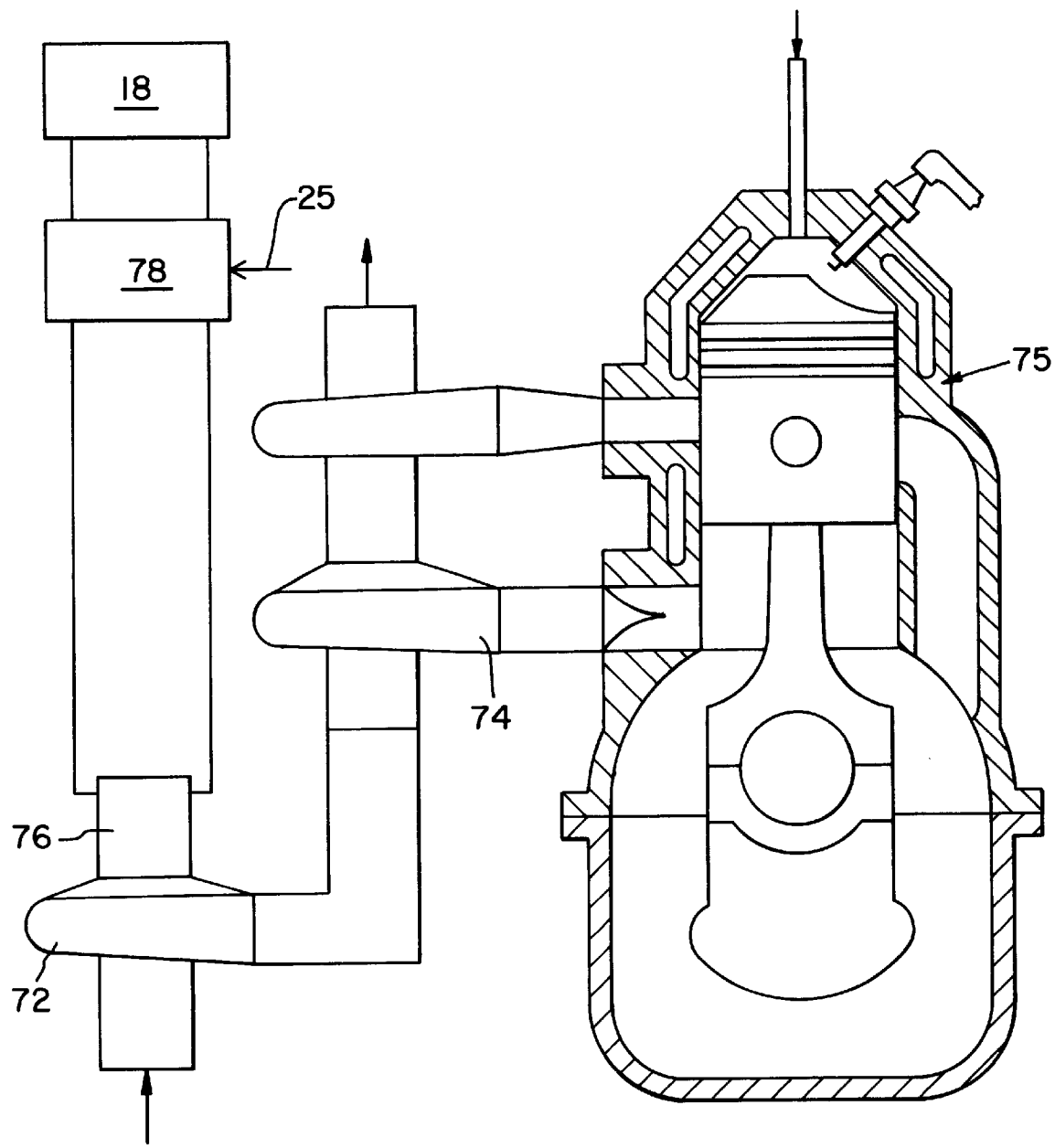
FIG. 6 shows a diagrammatic cross-section of a crankcase-scavenged, two-cycle engine using a conventional turbocharger and a motor-driven compressor with their compressors arranged in series for charging and starting of the engine.

FIG. 6 illustrates a motor-driven compressor 72 and a turbocharger compressor 74 connected in series, as applied to a crankshaft scavenged, two-cycle internal combustion engine 75. The engine structure is similar to that shown in FIG. 3, and the turbocharger has the same connections. However, the compressor 72 driven by motor 76 is separate and series-connected in the air flow. The control means 78 controls motor 76 in response to the type of signals previously discussed.

Figure 7:
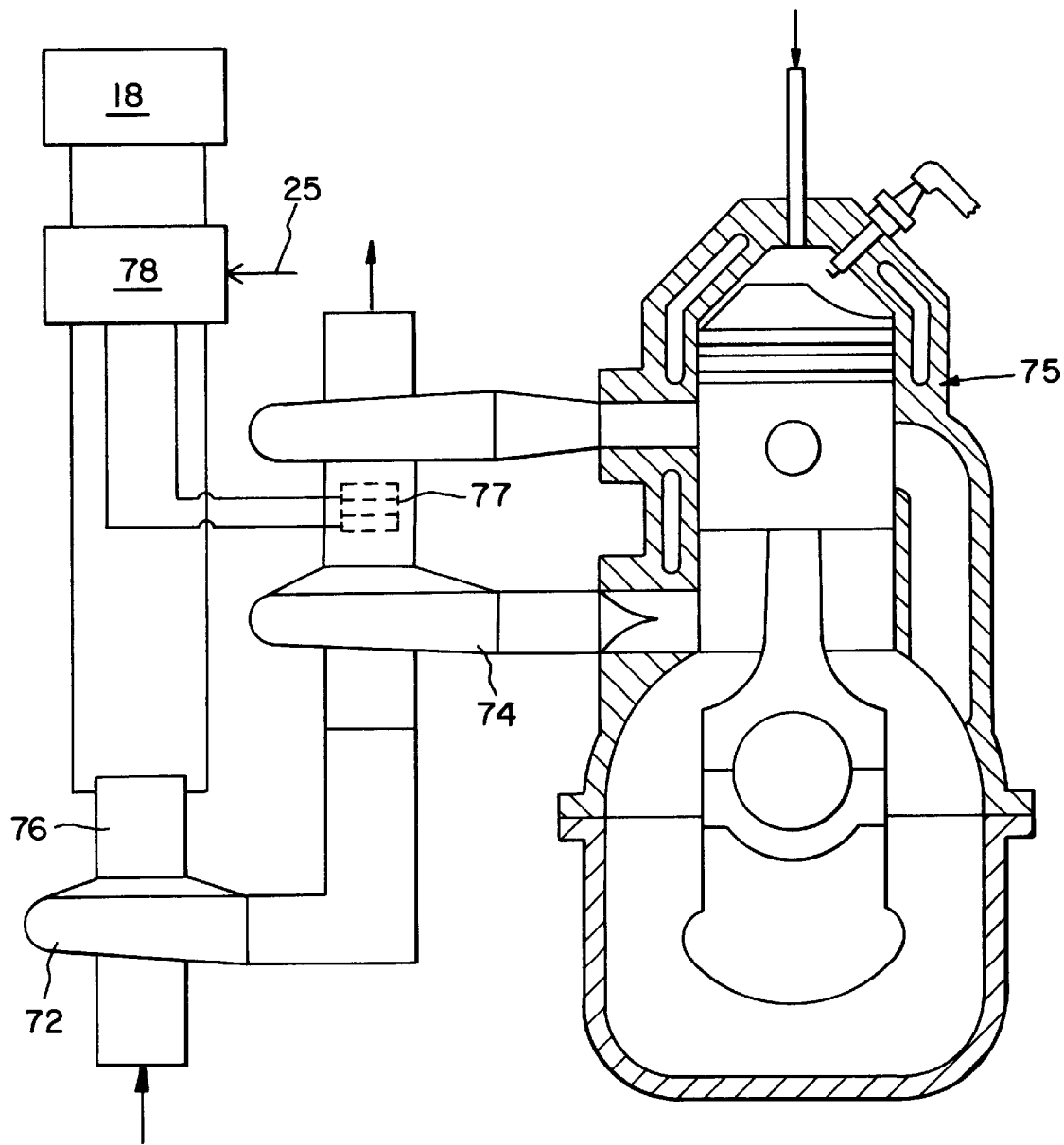
FIG. 7 shows a diagrammatic cross-section of a crankcase-scavenged, two-cycle engine using a motor-assisted turbocharger and a motor-driven compressor with their compressors arranged in series for starting and charging of the engine.

FIG. 7 illustrates a crankcase-scavenged, two-cycle engine using a motor-assisted turbocharger and a motor-driven compressor with their compressors arranged in series for starting and charging the engine. The embodiment of FIG. 7 is similar to that of FIG. 6 except that the turbocharger is provided with an internal motor 77. As in previous embodiments, the internal motor 77 can be energized when needed or desired to assist in supplying starting air for starting the engine, to provide additional power during times of engine acceleration under load, for maintaining the speed of the turbocharger rotor at a predetermined minimum level, and the like.

Figure 8:
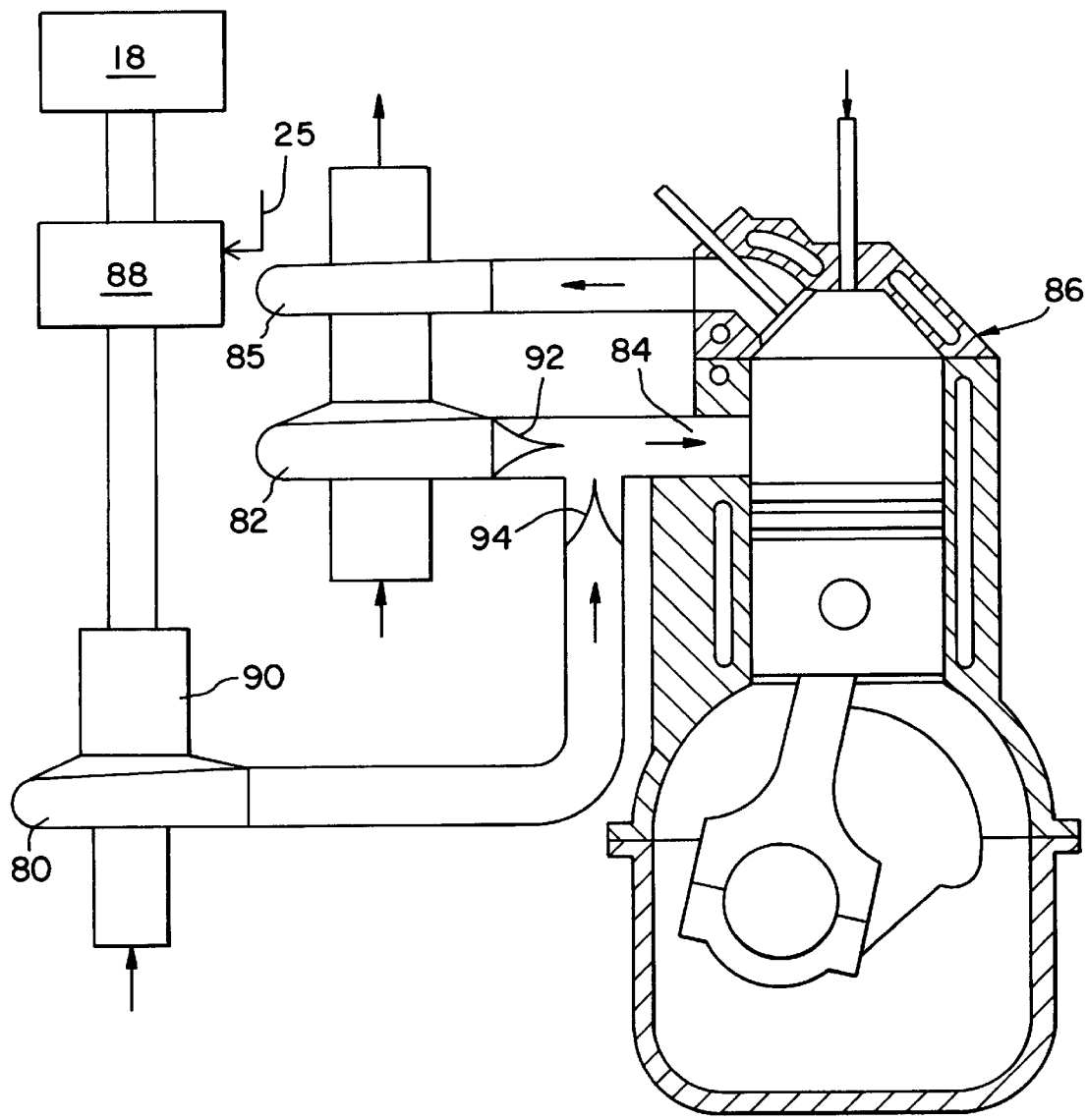
FIG. 8 shows a diagrammatic cross-section of a uniflow-scavenged, two-cycle engine using a conventional turbocharger and a motor-driven compressor with their compressors arranged in parallel, and check valves in each compressor outlet duct to prevent backflow of air through the compressor having inferior output pressure.

FIG. 8 illustrates a motor-driven compressor 80 and a turbocharger compressor 82 connected in a parallel flow arrangement in which the compressed air from the motor-driven compressor 80 is admitted to the intake duct of the engine 86 at a point between the turbocompressor 82 and the engine intake manifold 84, providing nearly instantaneous supercharging of the scavenging system upon demand. When the turbocharger speed of the exhaust gas turbine 85 rises sufficiently to produce a pressure output exceeding that of the motor-driven compressor, the motor control means 88 will signal the motor 90 to shut off. Backflow of air from either compressor through the other compressor is prevented by the placement of pressure activated reed check valves 92 and 94 or other types of fast-acting valves. Motor control means 88 is provided to command shutoff of the motor-driven compressor when not needed.

Figure 9:
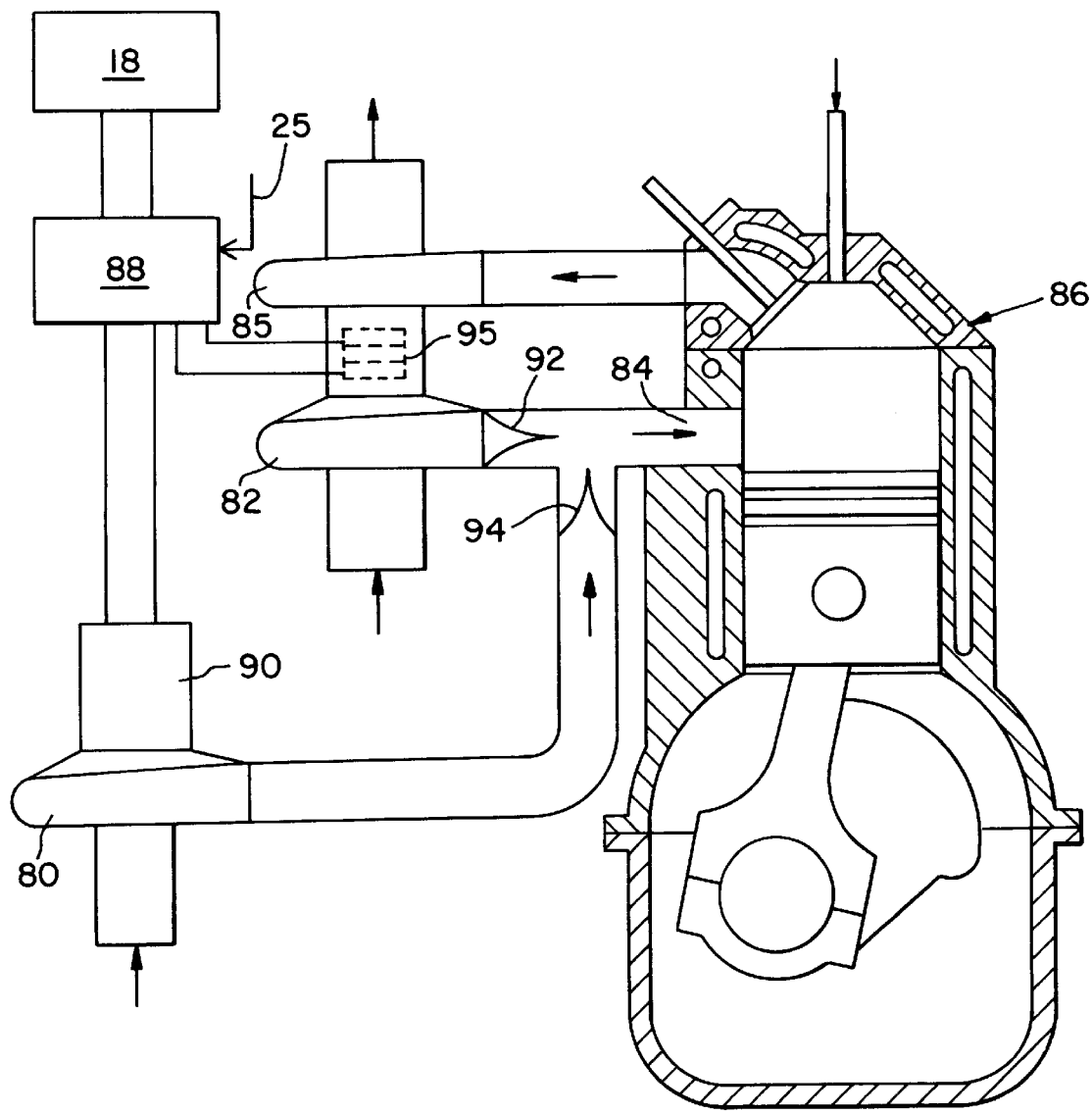
FIG. 9 shows a diagrammatic cross-section of a uniflow-scavenged, two-cycle engine using a motor-assisted turbocharger and a motor-driven compressor with their compressors arranged in parallel and check valves in each compressor outlet duct to prevent back flow of air through the compressor having inferior output pressure.

The embodiment of FIG. 9 is similar to that of FIG. 8 except that an internal motor 95 is provided for the turbocharger. Specifically, FIG. 9 illustrates a uniflow-scavenged, two-cycle engine using a motor-assisted turbocharger and a motor-driven compressor with their compressors arranged in parallel and check valves in each compressor outlet duct to prevent backflow of air through the compressor having inferior outlet pressure. As in previous embodiments, the turbocharger motor 95 can be energized when needed or desired to assist in supplying additional starting air for starting the engine, to provide additional power during times of engine acceleration under load, for maintaining the speed of the turbocharger rotor at a predetermined level, and the like.

This invention has been described in several of its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A two-stage charge air system for two-cycle internal combustion engines, comprising:
   (a) a two-cycle internal combustion engine having at least one cylinder with a piston reciprocating therein and having an intake valve or port for each cylinder and an exhaust valve or port for each cylinder;
   (b) an intake manifold connected to supply charging and scavenging air to each said intake valve or port;
   (c) an exhaust manifold connected to receive exhaust gas flow from each said cylinder;
   (d) a turbocharger having an exhaust gas turbine arranged to receive exhaust gas flow from said exhaust manifold and a centrifugal compressor having an air inlet and arranged to deliver compressed air to said intake manifold;
   (e) a motor-driven centrifugal compressor having a compressor scroll, the outlet of said compressor scroll being connected to said air inlet of said turbocharger centrifugal compressor; and
   (f) control means to supply power to said motor-driven centrifugal compressor to deliver charge air through said turbocharger centrifugal compressor to said intake manifold of said engine for starting and maintaining engine operation at low speed and load, said control means supplying power to the motor-driven centrifugal compressor to maintain a predetermined minimum speed of said motor-driven centrifugal compressor to overcome resistant to air flow being drawn through said motor-driven centrifugal compressor by said turbocharger centrifugal compressor.

2. A two-stage charge air system for two-cycle internal combustion engines, comprising:
   (a) a two-cycle internal combustion engine having at least one cylinder with a piston reciprocating therein and having an intake valve or port for each cylinder and an exhaust valve or port for each cylinder;
   (b) an intake manifold connected to supply charging and scavenging air to each said intake valve or port;
   (c) an exhaust manifold connected to receive exhaust gas flow from each said cylinder;
   (d) a turbocharger having an exhaust gas turbine arranged to receive exhaust gas flow from said exhaust manifold and a centrifugal compressor having an air inlet and arranged to deliver compressed air to said intake manifold;
   (e) a motor-driven centrifugal compressor having a compressor scroll, the outlet of said compressor scroll being connected to said air inlet of said turbocharger centrifugal compressor; and
   (f) control means to supply power to said motor-driven centrifugal compressor to deliver charge air through said turbocharger centrifugal compressor to said intake manifold of said engine for starting and maintaining engine operation at low speed and load, said controls means being connected to said two-cycle internal combustion engine to receive signals therefrom so that said two-cycle internal combustion engine receives air from said compressor scroll to allow additional power to be produced from said engine to achieve faster acceleration by said engine and to operate said two-cycle internal combustion engine so as to reduce exhaust pollutants.

* * * * *